United States Patent
Rodriguez et al.

(10) Patent No.: US 10,864,588 B2
(45) Date of Patent: Dec. 15, 2020

(54) BALL VALVE RETAINER WITH SOLDERING PASTE SEAL AND METHOD

(71) Applicant: Conbraco Industries, Inc., Matthews, NC (US)

(72) Inventors: Bertito Tubo Rodriguez, Charlotte, NC (US); Kevin Gerome Porterfield, Indian Trail, NC (US); Rudy Ray Stewart, Jefferson, SC (US)

(73) Assignee: Conbraco Industries, Inc., Matthews, NC (US)

( * ) Notice: Subject to any disclaimer, the term of this patent is extended or adjusted under 35 U.S.C. 154(b) by 100 days.

(21) Appl. No.: 15/822,609

(22) Filed: Nov. 27, 2017

(65) Prior Publication Data
US 2019/0160569 A1 May 30, 2019

(51) Int. Cl.
| | |
|---|---|
| *B23K 1/00* | (2006.01) |
| *F16K 27/06* | (2006.01) |
| *F16K 31/60* | (2006.01) |
| *F16K 5/06* | (2006.01) |

(52) U.S. Cl.
CPC .......... *B23K 1/0008* (2013.01); *F16K 5/0642* (2013.01); *F16K 5/0657* (2013.01); *F16K 5/0689* (2013.01); *F16K 27/067* (2013.01); *F16K 31/602* (2013.01)

(58) Field of Classification Search
CPC ............ Y10T 137/6035; B23K 1/0008; F16K 5/0657; F16K 5/0689; F16K 27/067; F16K 31/602; B05C 5/0216; B05C 5/022; B05B 13/0228; B05B 13/0242

USPC .......................................................... 118/320
See application file for complete search history.

(56) References Cited

U.S. PATENT DOCUMENTS

| | | | | |
|---|---|---|---|---|
| 3,567,176 A | * | 3/1971 | Johnson | F16K 5/0631 251/172 |
| 3,990,623 A | * | 11/1976 | Fortune | B23K 3/027 228/57 |
| 4,175,558 A | | 11/1979 | Hess, III et al. | |
| 4,531,272 A | * | 7/1985 | Cohen | B23P 15/001 137/15.18 |
| 4,560,100 A | * | 12/1985 | Hall | B23K 1/0056 228/40 |

(Continued)

FOREIGN PATENT DOCUMENTS

| | | |
|---|---|---|
| CN | 101660615 A | 3/2010 |
| CN | 102654202 B | 8/2016 |
| EP | 0793594 A1 | 9/1997 |

OTHER PUBLICATIONS

LPS-281 Safety data Sheet Fusion Inc; (Year: 2015).*

(Continued)

*Primary Examiner* — Kevin R Barss
(74) *Attorney, Agent, or Firm* — Shumaker, Loop & Kendrick, LLP

(57) ABSTRACT

A method of sealing a metal retainer to a metal valve body that includes the steps of applying a soldering paste in a predetermined amount to the threads of a threaded retainer and threading the retainer into the threads of a threaded opening in the valve. The retainer is heated to a temperature sufficient to liquefy and disperse the soldering paste into spaces between the threads of the retainer and the threads of the opening in the valve to thereby achieve an adhesive seal.

16 Claims, 3 Drawing Sheets

(56) References Cited

U.S. PATENT DOCUMENTS

| | | | | | |
|---|---|---|---|---|---|
| 4,595,816 | A | * | 6/1986 | Hall | B23K 1/0056 |
| | | | | | 219/121.64 |
| 5,196,667 | A | * | 3/1993 | Gammelin | B23K 1/012 |
| | | | | | 219/85.12 |
| 5,262,197 | A | * | 11/1993 | Pollizzi | B05D 1/12 |
| | | | | | 427/195 |
| 5,533,549 | A | * | 7/1996 | Sherman | F16K 27/067 |
| | | | | | 137/556.6 |
| 6,145,735 | A | * | 11/2000 | Mallery | B23K 1/008 |
| | | | | | 228/254 |
| 6,484,925 | B2 | * | 11/2002 | Harding | F16L 13/08 |
| | | | | | 228/119 |
| 8,348,135 | B2 | * | 1/2013 | Lawrence | B23K 35/3612 |
| | | | | | 148/23 |
| 2004/0195836 | A1 | * | 10/2004 | Hosoya | B23K 1/0008 |
| | | | | | 285/333 |
| 2007/0029365 | A1 | | 2/2007 | Paul et al. | |
| 2008/0318079 | A1 | | 12/2008 | Ballantyne | |
| 2010/0206917 | A1 | | 8/2010 | Tudor | |
| 2015/0247579 | A1 | * | 9/2015 | Corte, Jr. | F16K 5/0642 |
| | | | | | 251/315.1 |

OTHER PUBLICATIONS

Jomar Valve; 2 Piece Full Port Threaded Connection 600 WOG with Steam Trim; Brass Ball Valve; 2016 Jamar Valve; www.jemarvalve.com.

Zhejiang Ouyi Valve Co., Ltd; Ouy/Orbi/T Ball Valve; OUYI Equipments; Wenzhou City, Zhejiang Province, China.

* cited by examiner

BALL VALVE RETAINER WITH SOLDERING PASTE SEAL AND METHOD

TECHNICAL FIELD AND BACKGROUND OF THE INVENTION

This invention relates to a method for sealing connections in valves, and to valves having a seal formed by the method. The invention in this application has application to any type of valve that requires an effective seal between threaded engagement surfaces. Valves of this general type include two-piece brass or bronze solder-end connection valves, brass or bronze wedge gate valves, brass or bronze check valves and brass or bronze globe and angle valves, among other valve types. For the purpose of disclosing one embodiment of the invention the application references a two-piece split-body quarter turn ball valve. This type of valve may be exposed to high temperature conditions during normal and/or beyond normal soldering or brazing processes.

A valve, such as a split-body quarter-turn ball valve, includes a pivoting hollow ball, seats, stem sub-assembly, lever, body and a retainer. The assembly of the seats, ball and stem sub-assembly can be accessed from the larger opening end of the body, and the threaded engagement between the body and the retainer captures the internal components of the valve. The threaded engagement of the valve components have to be fully sealed from maximum rated internal pressures and temperatures by an internal metal-to-metal seal between the body and retainer. This typically involves tightening the valve retainer according to specified torque values to the valve body to achieve the metal-to-metal seal. In addition, prior art processes include the application of a thread sealant or retaining compound to provide secondary protection. However, when the valve is subjected to high temperature conditions during normal and/or beyond normal soldering or brazing process, the thread sealant or retaining compound in the threads can fail, thus leading to loss of a complete or positive seal.

This can be a serious problem causing leakage of fluid contents of the system in communication with the valve, damage to surrounding areas, valve replacement and consequent expense. There is thus a need for a safe, secure and inexpensive method for providing a complete, robust seal between threaded valve components.

SUMMARY OF THE INVENTION

It is therefore an object of the present invention to provide a complete and effective seal between metal valve components.

It is another object of the invention to provide valves of diverse types that have provision for enhanced sealing between valve components.

It is another object of the invention to provide a method for achieving in valves of diverse types a secure seal between valve components.

It is another object of the invention to provide a method for applying sealing materials to valves of diverse types that achieve a secure seal between valve components.

It is another object of the invention to provide a method that includes the application of a soldering paste at a predetermined amount around the external threads of a valve component such as a valve retainer such that when heat in an amount normally required to solder or braze the end connection is applied, the soldering paste is liquefied to provide soldering effect, maximum adhesion between body and retainer, and complete sealing efficiency.

These and other objects and advantages of the invention are obtained by providing a method of sealing a metal retainer to a metal valve body that includes the steps of applying a soldering paste in a predetermined amount to the threads of a threaded retainer and then threading the retainer into the threads of a threaded opening in the valve. The retainer is heated to a temperature sufficient to liquefy and disperse the soldering paste into spaces between the threads of the retainer and the threads of the opening in the valve to thereby achieve an adhesive seal.

According to another aspect of the invention, the valve is a ball valve having a ball positioned in a valve body for rotation between open and closed positions with upstream and downstream annular seals positioned on respective upstream and downstream sides of the ball.

The retainer engaging one of the upstream and downstream seals and urges the upstream and downstream seals against interior walls of the valve body.

According to another aspect of the invention, the step of applying the soldering paste to the retainer includes the step of rotating the retainer past a stationary soldering paste applicator.

According to another aspect of the invention, the soldering paste has a liquidus of 281° F. (138° C.).

According to another aspect of the invention, the method includes the step of tightening the threaded retainer onto the body to a torque sufficient to create a metal-to-metal contact between adjacent surfaces of the retainer and body.

According to another aspect of the invention, the metal-to-metal contact between adjacent surfaces of the retainer and the body is created with sufficient torque to create a contact impression in the adjacent surfaces of the retainer and body.

According to another aspect of the invention, the step of applying the soldering paste to the threads of the retainer includes the step of dispensing the soldering paste through an applicator gun under air pressure.

According to another aspect of the invention, a method of sealing a metal retainer to a metal valve body is provided, wherein the valve is a quarter-turn ball valve of the type wherein a ball sealed within a valve body is adapted to be turned on a stem rotated by a lever external to the valve body. The method includes the steps of applying a soldering paste in a predetermined amount to the threads of a threaded retainer and threading the retainer into the threads of a threaded opening in the valve thereby sealing the ball against upstream and downstream annular seals. The retainer is heated to a temperature sufficient to liquefy and disperse the soldering paste into spaces between the threads of the retainer and the threads of the opening in the valve to thereby achieve an adhesive seal.

According to another aspect of the invention, the valve has a 1 inch (2.5 cm) thread size and 0.5 grams of soldering paste is applied to the threads of the retainer.

According to another aspect of the invention, the step of applying the soldering paste to the retainer includes the step of rotating the retainer past a stationary soldering paste applicator.

According to another aspect of the invention, the soldering paste has a liquidus of 281° F. (138° C.).

According to another aspect of the invention, the method includes the step of applying the soldering paste to the threads of the retainer through an applicator gun under air pressure.

According to another aspect of the invention, a metal valve for controlling the flow of a fluid through a fluid transport system is provided, and includes a valve body and a fluid control structure moveable within the valve body for controlling the flow of the fluid, and upstream and downstream seals positioned in the valve body and engaging upstream and downstream sealing surfaces of the fluid control structure. An operating device having an exterior part and a part extending into the valve body is provided for moving the fluid control structure. A retainer is provided for being threaded onto a threaded opening in the valve to enclose the valve body. A soldering paste is positioned in the spaces between the threads of the retainer and the threads of the threaded opening in the valve, the position of the soldering paste being achieved by first applying a predetermined quantity of soldering paste to the threads of the retainer, threading the retainer into the threaded opening in the valve body and then heating the soldering paste to a liquid state whereupon the liquefied solder is dispersed into spaces between the threads of the retainer and the threads of the valve body to provide an adhesive and sealing effect to the valve.

According to another aspect of the invention, threaded retainer is tightened onto the body to a torque sufficient to create a metal-to-metal contact between adjacent surfaces of the retainer and body.

According to another aspect of the invention, the metal-to-metal contact between adjacent surfaces of the retainer and the body includes an impression in the adjacent surfaces of the retainer and body.

According to another aspect of the invention, the metal of the valve body and valve retainer is selected from the group consisting of brass and bronze.

According to another aspect of the invention, the metal of the valve body and valve retainer is selected from the group consisting of brass and bronze and the valve is a quarter-turn ball valve.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
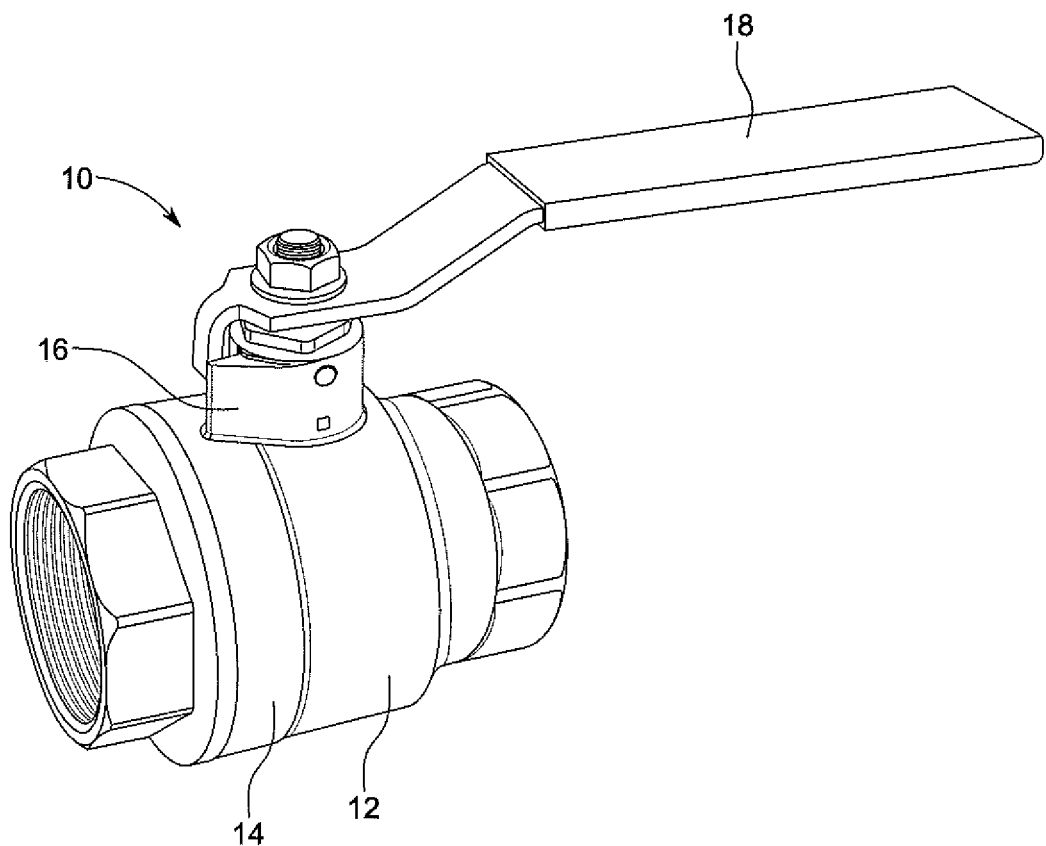
FIG. 1 is a perspective view of a ball valve of a type to which the invention is applicable.

Referring now to the drawings, a split body quarter-turn ball valve is shown at reference numeral 10, and includes a body 12, retainer 14, stem sub-assembly 16 and lever 18. In use, the assembled ball valve 10 is introduced into a plumbing or gas line as a means of controlling the flow of the fluid line contents downstream from a source. As noted above, this specific type of valve is merely illustrative of a wider range of valves, the structure of which allows the novel aspects of the invention disclosed in this application to be applied.

Figure 2:
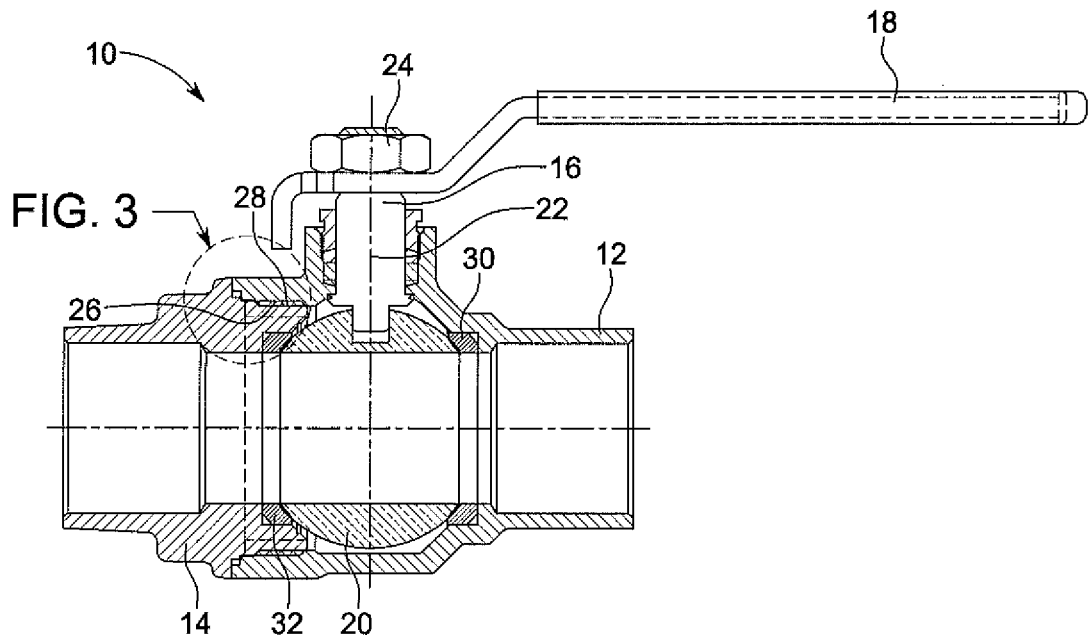
FIG. 2 is vertical cross-section of a valve of the type shown in FIG. 1.

Referring now to FIG. 2, the body 12 of the valve 10 houses a fluid control structure in the form of a ball 20 that is connected to a stem 22 positioned in the stem sub-assembly 16 and fastened to the valve body 12 by a nut 24. The lever 18 resides on the stem 22 and is used to rotate the ball 20 a quarter turn between an open, flow position as shown in FIG. 2, a closed 90 degree position, not shown, and partially open/closed positions, not shown.

Figure 3:
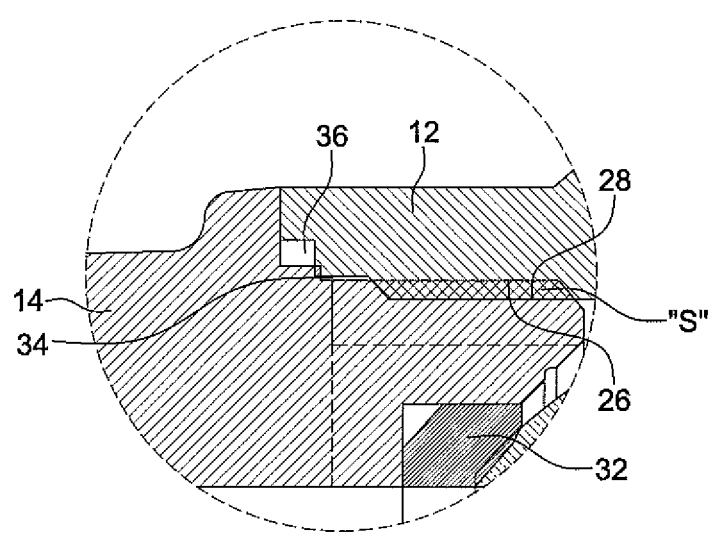
FIG. 3 is an enlarged fragmentary, vertical cross-section of the valve of FIG. 2 to show detail.

By continued reference to FIG. 2 and also to FIG. 3, the body 12 includes interior threads 26 that permit the retainer 14 to be threaded into the body 12 utilizing the exterior threads 28 on the surface of the retainer 14.

The ball 20 is sealed in the body 12 by annular metal seals 30, 32 that reside in spaces provided in the body 12 and retainer 14, respectively. The seal is effectuated by tightening the threaded retainer 14 onto the threaded body 12, which urges seal 32 against the ball 20 and the ball 20 against the seal 30. As is best shown in FIG. 3, gaps and voids inherently exist between the threads 26 and 28 in order to permit movement of the threads 26 and 28 past each other and to allow for thermal expansion and contraction. In a prior art technique, as noted above, once the retainer 14 has been tightened onto the body 12, a thread sealant or locking compound, such as a suitable Locktite® thread blocker manufactured by Henkel Corporation, is applied to the threads 26 and 28 to fill any gaps and to further seal the ball 20 within the body 12.

However, it is common for thread blockers as applied to extend beyond the maximum gap fill specified by the thread blocker manufacturer. In such cases, when the valve 10 is heated by soldering or brazing during connection into a fluid line, the thread blocker can be damaged and the bonding efficiency of the thread blocker can be compromised, resulting in creation of a leak path around the threads 26 and 28.

In accordance with an aspect of the invention, the threads 26 of the retainer 14 are filled with soldering paste "S" in an application method described below. With the application of a soldering paste "S" with a liquidus of 281° F. (138° C.) at a predetermined amount depending on thread size, the amount of heat required to normally solder or braze the valve 10 into a fluid line is more than sufficient to liquefy the soldering paste "S" to provide both an adhesive and a soldering effect, resulting in maximum adhesion between body 12 and retainer 14, and complete sealing efficiency. The liquid soldering paste "S" will flow by both thermal expansion pressure and capillary action into the voids 34 and 36 normally present in valve connections of this type, providing a particularly complete adhesion and soldering effect when the soldering paste cools to a solid.

As described below, the retainer 14 is screwed into the body 12 to a specified torque, which is sufficient to cause the retainer to bite into the body 12 and create a secure metal-to-metal contact impression. This metal-to-metal contact is shown in FIG. 3 as a cross-hatched area between the voids 34 and 36. This metal-to-metal contact between the retainer 14 and body 12 increases the sealing efficiency of the solder paste by insuring that there is no relative movement between the retainer 14 and body 12 after assembly has been completed, and that material thermal expansion is prevented. By designing the metal-to-metal contact internally or recessed from the external edge of the body, the contact surface is protected from damage during transit or handling, and at the specified torque, the contact impression between the retainer 14 and body 12 provides a secure seal.

As long as the retainer 14 is not reheated to the extent that allows the soldering paste to liquefy, the joined threads act as a solid, one-piece connection. The heating of the retainer 14 to liquefy the soldering paste "S" may take place as an integral event with the connection of the valve 10 into a fluid line, or before or after such connection.

Figure 4:
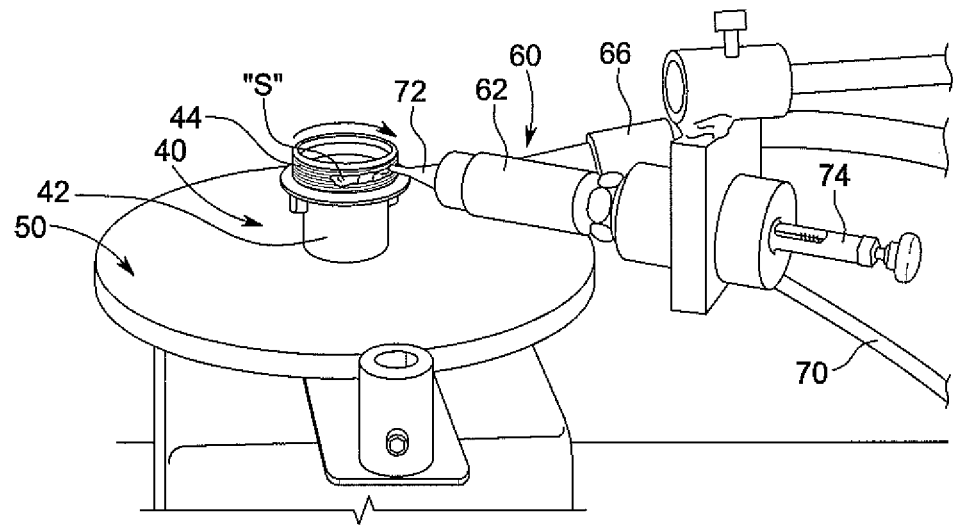
FIG. 4 is a partial perspective view of a soldering application apparatus and turntable that applies soldering paste to the threads of a valve such as a valve of the type shown in FIG. 1.

Referring now to FIG. 4, a retainer 40 is shown positioned on an applicator 60 for application of a uniformly-controlled quantity of soldering paste "S". The retainer 40 is mounted by its body 42 on a turntable 50 and rotated as a bead of soldering paste "S" is applied to threads 44 by an applicator gun 62 directed at the threads 44 in a radially-aligned position and direction. After application of the soldering paste "S", the retainer 40 is removed and screwed into a valve body (not shown), held against rotation in a fixture and tightened to a specified torque that, as described above is sufficient to provide the metal-to-metal contact between the retainer 14 and body 12.

In one preferred embodiment of the invention, a 1 inch (2.5 cm) thread size retainer receives an application of 0.5 grams of soldering paste "S". A suitable soldering paste is LPS-281 manufactured by Fusion Incorporated having a liquidus of 281° F. (138° C.).

Figure 5:
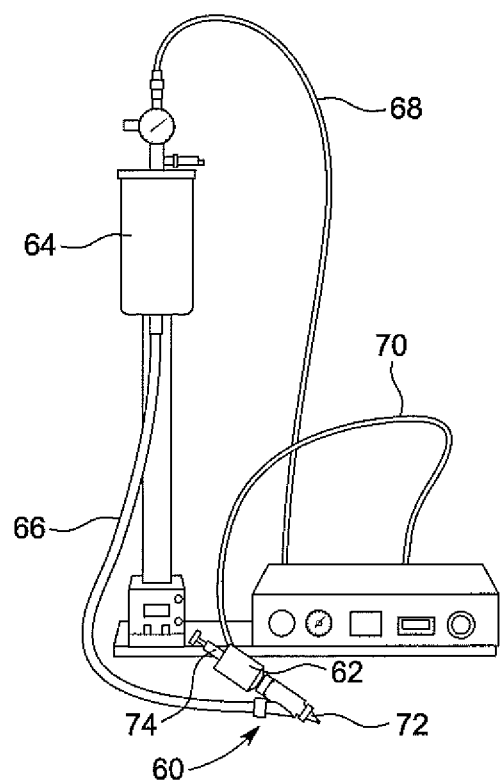
FIG. 5 is a view of the soldering paste application apparatus of FIG. 4.

As shown in FIG. 5, a Fusion Incorporated Model 710 digital dispensing system is one preferred embodiment used to apply the soldering paste "S". The applicator 60 includes the applicator gun 62 supplied with soldering paste "S" from a reservoir 64 through a supply hose 66. The soldering paste "S" is forced from the reservoir 64 by air from an air line 68. The applicator gun 62 is controlled by compressed air from an air line 70. The applicator gun also includes a nozzle 72 and a stroke adjustment knob 74.

Methods for sealing connections in valves using soldering paste and valves treated according to these methods have been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. A method of sealing a threaded metal retainer to a metal valve body, comprising the steps of:
    (a) rotating the retainer past a stationary soldering paste applicator;
    (b) applying a soldering paste in a predetermined amount to the threads of the retainer as the retainer rotates wherein the valve has a 1 inch (2.5 cm) thread size and 0.5 grams of soldering paste is applied to the threads of the retainer;
    (c) threading the retainer into the threads of a threaded opening in the valve; and
    (d) heating the retainer to a temperature sufficient to liquefy and disperse the soldering paste into spaces between the threads of the retainer and the threads of the opening in the valve to thereby achieve an adhesive seal.

2. A method according to claim 1, wherein the valve comprises:
    (a) a ball valve having a ball positioned in a valve body for rotation between open and closed positions;
    (b) upstream and downstream annular seals positioned on respective upstream and downstream sides of the ball; and
    (c) the retainer engaging one of the upstream and downstream seals and urging the upstream and downstream seals against interior walls of the valve body.

3. A method according to claim 1, wherein the soldering paste has a liquidus of 281° F. (138° C.).

4. A method according to claim 1, wherein the stationary soldering paste applicator includes an applicator gun under air pressure.

5. A method according to claim 1, and including the step of tightening the threaded retainer onto the body to a torque sufficient to create a metal-to-metal contact between adjacent surfaces of the retainer and body.

6. A method according to claim 5, wherein the metal-to-metal contact between adjacent surfaces of the retainer and the body is created with sufficient torque to create a contact impression in the adjacent surfaces of the retainer and body.

7. A method of sealing a threaded metal retainer to a metal valve body of a quarter-turn ball valve of the type wherein a ball sealed within a valve body is adapted to be turned on a stem rotated by a lever external to the valve body, comprising the steps of:
    (a) rotating the retainer past a stationary soldering paste applicator;
    (b) applying a soldering paste in a predetermined amount to the threads of the retainer as the retainer rotates wherein the valve has a 1 inch (2.5 cm) thread size and 0.5 grams of soldering paste is applied to the threads of the retainer;
    (c) threading the retainer into the threads of a threaded opening in the valve thereby sealing the ball against upstream and downstream annular seals;
    (d) tightening the threaded retainer onto the body to a torque sufficient to create a metal-to-metal contact between adjacent surfaces of the retainer and body; and
    (e) heating the retainer to a temperature sufficient to liquefy and disperse the soldering paste into spaces between the threads of the retainer and the threads of the opening in the valve to thereby achieve an adhesive seal.

8. A method according to claim 7, wherein the metal-to-metal contact between adjacent surfaces of the retainer and the body is created with sufficient torque to create a contact impression in the adjacent surfaces of the retainer and body.

9. A method according to claim 5, wherein the soldering paste has a liquidus of 281° F. (138° C.).

10. A method according to claim 7, wherein the stationary soldering paste applicator is an applicator gun under air pressure.

11. A metal valve for controlling the flow of a fluid through a fluid transport system, comprising:
    (a) a valve body and a fluid control structure moveable within the valve body for controlling the flow of the fluid;
    (b) upstream and downstream seals positioned in the valve body and engaging upstream and downstream sealing surfaces of the fluid control structure;
    (c) an operating device having an exterior part and a part extending into the valve body for moving the fluid control structure;
    (d) a threaded retainer for being threaded onto the threads of a threaded opening in the valve to enclose the valve body; and
    (e) a soldering paste positioned in the spaces between the threads of the retainer and the threads of the threaded opening in the valve wherein the position of the soldering paste was achieved by first applying a predetermined quantity of soldering paste to the threads of the retainer with a stationary soldering paste applicator as the retainer rotates past the applicator, threading the retainer into the threaded opening in the valve body and heating the soldering paste to a liquid state whereupon the liquefied solder is dispersed into spaces between the threads of the retainer and the threads of the valve body to provide an adhesive and sealing effect to the valve, wherein the valve has a 1 inch (2.5 cm) thread size and 0.5 grams of soldering paste is applied to the threads of the retainer.

12. A metal valve according to claim 11, wherein adjacent surfaces of the retainer and the body are in metal-to-metal contact.

13. A metal valve according to claim 11, wherein adjacent surfaces of the retainer and the body are in metal-to-metal contact with sufficient torque to create a contact impression in the adjacent surfaces of the retainer and body.

14. A metal valve according to claim 11, wherein the metal of the valve body and valve retainer is selected from the group consisting of brass and bronze.

15. A method according to claim 11, wherein the metal of the valve body and valve retainer is selected from the group consisting of brass and bronze and the valve is a quarter-turn ball valve.

16. A method according to claim 11, wherein the heating step includes the liquefied paste flowing into voids between an end of the retainer and an end of the valve body.

* * * * *